United States Patent [19]

Hartwig

[11] 3,905,393
[45] Sept. 16, 1975

[54] MULTIPLE-WAY HYDRAULIC VALVE

[75] Inventor: Manfred Hartwig, Nellingen, Germany

[73] Assignee: G. L. Rexroth GmbH, Lohr, Main, Germany

[22] Filed: Nov. 27, 1973

[21] Appl. No.: 419,156

[30] Foreign Application Priority Data
Dec. 1, 1972   Germany............................ 2258853

[52] U.S. Cl. ...................... 137/596.14; 137/DIG. 2
[51] Int. Cl.² ................. F16K 11/087; F16K 11/20
[58] Field of Search...... 137/596.14, 596.15, 596.16, 137/596, 596.2, 625.6, 625.66, 112, 119, DIG. 2; 251/333

[56] References Cited
UNITED STATES PATENTS

| | | | |
|---|---|---|---|
| 1,042,151 | 10/1912 | Schnicke......................... | 137/DIG. 2 |
| 2,366,693 | 1/1945 | Benaway........................ | 137/596.2 |
| 2,368,281 | 1/1945 | Wittenberg.................... | 137/DIG. 2 |
| 2,583,185 | 1/1952 | McLeod......................... | 137/596.15 |
| 3,329,161 | 7/1967 | Ruchser......................... | 137/596.16 |
| 3,516,443 | 6/1970 | Hughes.......................... | 137/596 X |
| 3,581,762 | 6/1971 | Bracki............................ | 137/596.2 |
| R26,523 | 2/1969 | Tennis........................... | 137/596.15 X |

*Primary Examiner*—Martin P. Schwadron
*Assistant Examiner*—Robert J. Miller
*Attorney, Agent, or Firm*—Michael S. Striker

[57] ABSTRACT

A valve body has a valve chamber provided with a first and an opposite second port, and with a third port intermediate the first and the second ports. A first and a second valve seat are provided at the first and second port, respectively, and a third valve seat is provided intermediate the first and third ports. A valve member is movable in the valve chamber between a position in which it engages the first valve seat and disengages both the second and third valve seats, and another position in which it engages both the second and third valve seats and is disengaged from the first valve seat.

6 Claims, 4 Drawing Figures

3,905,393

MULTIPLE-WAY HYDRAULIC VALVE

BACKGROUND OF THE INVENTION

The present invention relates generally to a multiple-way valve, and more particularly to a multiple-way valve for hydraulic circuits.

It is already known to provide multiple-way valves for use in hydraulic circuits in which each conduit connected with a user is associated with two such valves. The valve members in these cases are usually spherical and are maintained in valve opening or valve closing position by a control flow of fluid which is controlled by a pre-control valve. The valve which connects the user conduit with the fluid reservoir in these constructions lets the pressurized control fluid enter through the gap between valve element and valve body into the user, such as a hydraulic cylinder or hydraulic motor, when the valve becomes connected with the tank even though the valve element is in closure position. This means that even then the user will be influenced despite the fact that the valve element is in closed position.

The entry of leakage fluid into the hydraulic user can be avoided if a one-way valve which closes in the direction towards the user is interposed in the supply conduit which supplies fluid to the user, or if the supply conduit is connected with that side of the valve which is opposed to the valve member. In the latter case, the connection between the valve and the fluid reservoir will be at the side of the valve member so that the control fluid which passes between the valve sleeve and the valve member will return into the tank as a leakage fluid. The same problem exists if other constructions are provided which permit in some operating conditions a flow of leakage fluid to the user or to the reservoir.

SUMMARY OF THE INVENTION

It is, accordingly, a general object of the invention to overcome the disadvantages of the prior art.

More particularly, it is an object of the invention to provide an improved multiple-way valve for use in hydraulic circuits, which reliably prevents the flow of leakage fluid in all operating conditions without any additional instrumentalities, such as one-way valves which would prevent such flow.

In keeping with the above objects, and with others which will become apparent hereafter, one feature of the invention resides in a multiple-way valve for hydraulic circuits which, briefly stated, comprises a valve body having a valve chamber provided with a first and an opposite second port, and with a third port intermediate the first and second ports. A first and a second valve seat are provided at the first and second ports, respectively, and a third valve seat is provided intermediate the first and third ports. A valve member is movable in the valve chamber between a position in which it engages the first valve seat and disengages both the second and third valve seats, so that fluid can flow between the second and third ports, and a position in which it engages both the second and third valve seats so that no fluid can flow between the second and third ports or between the first port and any of the second and third ports.

Of course, with this construction it is reliably assured that under no circumstances can there be a flow of leakage fluid from the port which is associated with the control fluid, to either the user or the tank.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
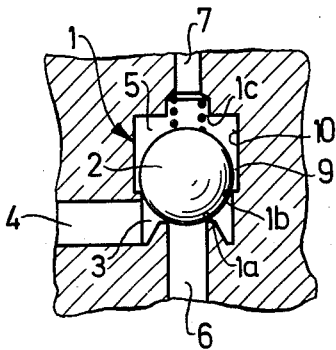
FIG. 1 is a diagrammatic section illustrating the construction and operating principle of the novel valve.

Referring firstly to FIG. 1 it will be seen that the valve illustrated therein utilizes a valve body or housing 1 formed with an internal valve chamber which is provided with ports and with valve seats $1a$, $1b$ and $1c$. The valve member is of spherical configuration in this embodiment and identified with reference numeral 2. In the position shown in FIG. 1, the valve member 2 closes both of the valve seats $1a$ and $1b$ which it engages at one and the same time. The valve chamber portion 3 located between the valve seats $1a$ and $1b$ is in communication with the user or with the pressure fluid reservoir via the conduit 4, and in the direction towards the valve chamber portion 5 it is closed by the valve seat $1b$, as well as the valve seat $1a$, so that no fluid can flow in this position between the conduit 6 which also communicates either with the user or the reservoir, and the conduit 4. The valve seats $1a$ and $1b$ are either simultaneously closed or opened as the valve member 2 moves.

In the open position of the valve member 2 the latter engages the valve seat $1c$ to interrupt the connection of the valve chamber portion 5 with the control fluid conduit 7, thus preventing passage of fluid into the chamber 5 through the conduit 7.

To provide for a reliable and effective control of the movements of the valve member 2, the effective cross section of a gap 9 between the inner cylindrical surface 10 bounding the valve chamber portion 5 and the valve member 2 is smaller than the effective cross section of the conduit 7. This assures that when the conduit 7 is connected with the reservoir, a pressure differential acts upon the valve member 2 in the direction of opening movement of the same, which assures a complete opening of the valve member 2 and a proper sealing engagement of the same with the valve seat $1c$.

Figure 2:
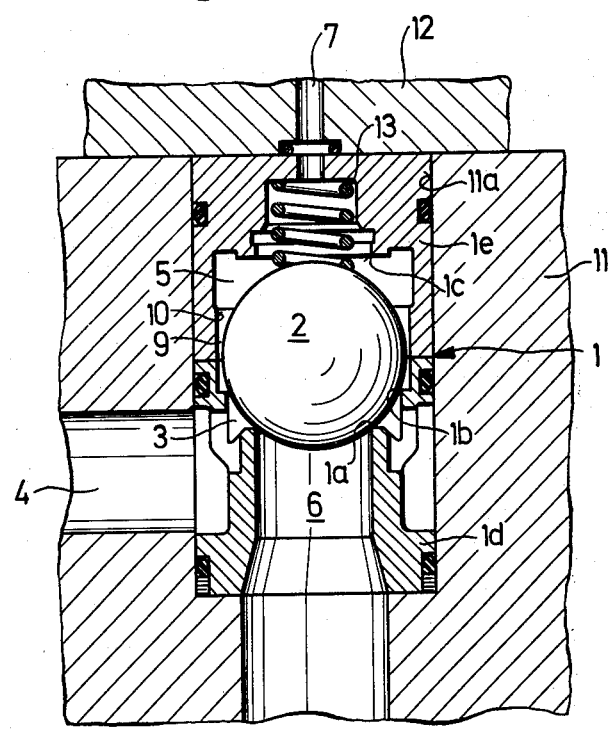
FIG. 2 is a section illustrating the structural details of a valve according to the present invention.

FIG. 2 shows that the housing 1 is advantageously sleeve-shaped and composed of a lower portion $1d$ and an upper portion $1e$. These two portions are inserted into a supporting member 11 having an appropriate bore $11a$ and are fixedly secured against movement relative to one another in axial direction by means of the plate 12. The lower portion $1d$ has the valve seats $1a$ and $1b$ and the upper portion $1e$ has the valve seat $1c$.

A spring 13 additionally serves to bias the valve member 2 in the indicated closure portion.

Figures 3, 4:
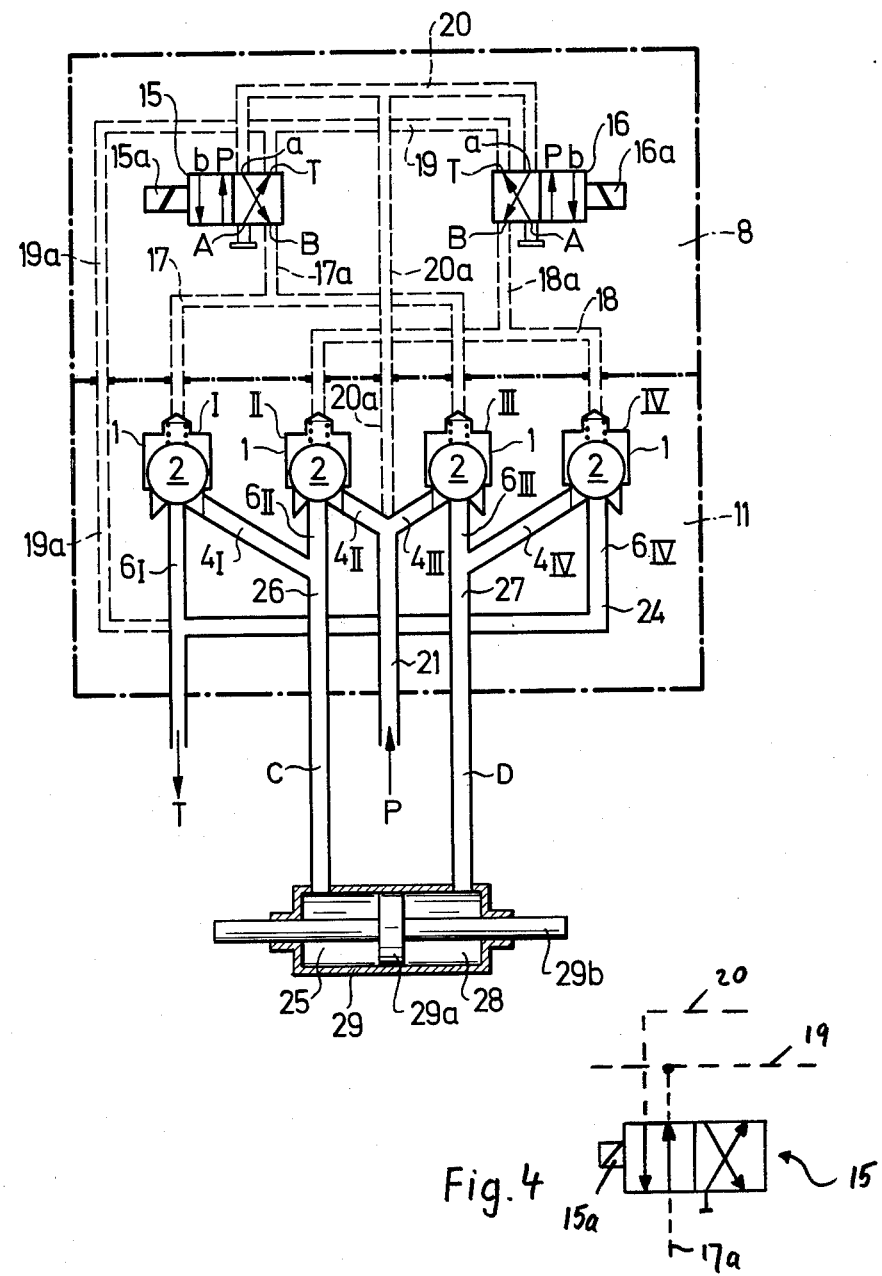
FIG. 3 is a diagram showing valves according to the present invention employed in a hydraulic circuit.
FIG. 4 shows a different operating position of one of the components of the circuit in FIG. 3.

The circuit in FIG. 3 shows four of the valves, identified with reference characters I, II, III and IV, which are combined to form a four-way valve. The valves are hydraulically operated by two electromagnetically controlled precontrol valves 15 and 16 which are constructed as four-way valves with two switching positions a and b. The valve 15 controls the valves I and III and the valve 16 controls the valves II and IV. Conduits 17, 17a, 18, 18a, 19, 19a, 20 and 20a are formed in the plate 8 and connect the various valves with one another. The one port A is clsoed in each of the valves 15 and 16, so that these valves operate in the illustrated embodiment as three-way valves with two operating positions or switching positions a and b, although they are inherently constructed as four-way valves.

The alternate position for one of the valves controlling the valves I and IV, namely the control valve 15, is illustrated by way of explanation in FIG. 4. The valve 16 can assume a similar position under the circumstances to be described below.

The control fluid for operating the valves I–IV is received in the illustrated embodiment from a pressure fluid source P, for which purpose the conduits 20 and 20a are in communication with the conduit 21 which, in turn, is in communication with the source P.

In the illustrated starting position of the control valves 15 and 16, the conduits 17, 17a communicating with the valves I and III are exposed to the pressure of pressure fluid from the source P, as are the conduits 18, 18a which lead to the valves II and IV. This means that the valve members 2 of the valves I–IV are maintained in their illustrated closure position. The additional valve seat 1b in each of the valves I–IV prevents a passage of control fluid via the conduits $4_I$–$4_{IV}$, the conduits 26, 27 and the conduits C, D into the working spaces 25, 28 of a user cylinder 29.

If the valve 15 is switched from the operating position a to the operating position b which is shown in FIG. 4, by energizing its electromagnet 15a, the conduits 17, 17a which communicate with the valves I and III are connected with the reservoir T via the conduits 19, 19a, so that the pressure acting upon their valve members 2 in a sense urging the latter to closure position, is relieved. The valve member 2 of the valve III is subjected to pressure via the conduit $4_{III}$ and the conduit 21 from the source P, so that it is urged in direction in which it opens. This means that when this valve member 2 is freed of the counter-pressure urging it to closure position, by movement of the valve 15 to the switching position b, this valve member 2 will be moved to open position so that the working space 28 of the cylinder 29 is connected via the conduit 27 or the source P. This results in a displacement of the piston 29a with the piston rod 29b in the direction towards the working space 25, so that fluid which is accommodated in the latter is expelled via the conduit C, the conduit 26 and the conduit $4_I$ into the valve chamber portion 3 of the valve I, causing the valve member 2 of the valve I to move to open position so that fluid can flow via the conduit $6_I$ into the reservoir T.

If the valve 15 is left in its position a shown in FIG. 3, and the valve 16 is instead switched from its position a into the position b, then the valves II, IV are connected via the conduits 18, 18a, 19, 19a with the reservoir T, so that in this case it is the valve members 2 of the valves II, IV which move from their closure position to their open position. This causes the working space 25 to be subject to the pressure of pressure fluid, and the working space 28 to be connected with the reservoir T. This means that the piston 29a with the piston rod 29b will now move in direction of the working space 28, so that the fluid contained in the latter is expelled via the valve IV, the conduits $6_{IV}$, 24 and returned to the reservoir T.

If both of the control valves 15 and 16 have their electromagnets 15a, 16a energized and are switched to the position b, then all conduits carrying control fluid are connected with the reservoir T, so that the working fluid which flows via the conduit 21 can return via the valves I–IV back to the reservoir T. In this position the cylinder 29 is in an intermediate or non-operative position.

The pre-control of the valves I–IV can also be carried out via a pressure medium that is not derived from the source P, in which case the conduit 20a is not connected via the conduit 21 with the source P, but instead with a different source. Also, the control fluid can be recirculated directly via the conduits 19 and 19a into the reservoir T. In this case, the connection of the conduit 19a with the conduit $6_{II}$ is interrupted.

Evidently, various modifications and different circuits can be made without in any way departing from the sense and intent of the present invention.

It will be understood that each of the elements described above, or two or more together, may also find a useful application in other types of constructions differing from the type described above.

While the invention has been illustrated and described as embodied in a multiple-way valve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A multiple-way valve for hudraulic circuits, comprising a valve body having a valve chamber bounded by a cylindrical surface having a first diameter, and provided with a first port for admitting control fluid into said chamber and surrounded by a first valve seat, a second port axially spaced from said first port and surrounded by a second valve seat, a third valve seat intermediate said first and second valve seats, said first and second ports and said first, second, and third valve seats being substantially coaxial with said cylindrical surface and having diameters smaller than said first diameter, and a third port extending transversely of said chamber and communicating therewith intermediate said second and third valve seats; and a spherical valve member mounted in said chamber for movement with respect thereto between a first position in which said valve member engages said second and third valve seats and interrupts communication between said second and third ports, and a second position in which said valve member engages said first valve seat and interrupts communication between said first port and said chamber, said valve member having a second diameter smaller than said first diameter and being mounted in said chamber with clearance from said cylindrical surface as said valve member moves between said positions thereof, so that frictional retardation of the movement of said valve member resulting from contact of the latter with said cylindrical surface is avoided.

2. A valve as defined in claim 1, wherein said valve body is sleeve-shaped and composed of a guide portion and a seat-forming portion.

3. A valve as defined in claim 1, wherein the diameters of said second and third valve seats differ from one another.

4. A valve as defined in claim 1, wherein said hydraulic circuit includes a user having two hydraulic lines at least one of which includes a branch communicating with a hydraulic fluid reservoir; and wherein said value is interposed in said branch.

5. A valve as defined in claim 1, and further comprising means for biasing said valve member into said first position.

6. A valve as defined in claim 1, wherein said valve body includes two portions together defining said chamber and separably connected to one another so as to permit introduction of said valve member into said chamber; and further comprising means for receiving said valve body and for connecting said portions thereof to one another so as to form a quick-installation module.

* * * * *